United States Patent
Shigeta et al.

(10) Patent No.: US 11,430,995 B2
(45) Date of Patent: Aug. 30, 2022

(54) GAS DIFFUSION ELECTRODE AND FUEL CELL

(71) Applicant: Toray Industries, Inc., Tokyo (JP)

(72) Inventors: Kazuyo Shigeta, Tokyo (JP); Masamichi Utsunomiya, Otsu (JP)

(73) Assignee: TORAY INDUSTRIES, INC., Tokyo (JP)

(*) Notice: Subject to any disclaimer, the term of this patent is extended or adjusted under 35 U.S.C. 154(b) by 690 days.

(21) Appl. No.: 16/475,515

(22) PCT Filed: Jan. 12, 2018

(86) PCT No.: PCT/JP2018/000569
§ 371 (c)(1),
(2) Date: Jul. 2, 2019

(87) PCT Pub. No.: WO2018/135381
PCT Pub. Date: Jul. 26, 2018

(65) Prior Publication Data
US 2019/0326605 A1 Oct. 24, 2019

(30) Foreign Application Priority Data
Jan. 19, 2017 (JP) .............................. JP2017-007303

(51) Int. Cl.
*H01M 4/86* (2006.01)
*H01M 4/88* (2006.01)

(52) U.S. Cl.
CPC ....... *H01M 4/8605* (2013.01); *H01M 4/8807* (2013.01)

(58) Field of Classification Search
CPC .................................................. H01M 4/8605
See application file for complete search history.

(56) References Cited

U.S. PATENT DOCUMENTS

| | | | |
|---|---|---|---|
| 10,249,886 B2 | 4/2019 | Okano et al. | |
| 10,256,477 B2 | 4/2019 | Utsunomiya et al. | |
| 10,297,833 B2 | 5/2019 | Kato et al. | |

(Continued)

FOREIGN PATENT DOCUMENTS

| | | |
|---|---|---|
| CN | 1180249 A | 4/1998 |
| CN | 102422469 A | 4/2012 |

(Continued)

OTHER PUBLICATIONS

International Search Report and Written Opinion for International Application No. PCT/JP2018/000569, dated Mar. 27, 2018—5 pages.

(Continued)

*Primary Examiner* — Brian R Ohara
(74) *Attorney, Agent, or Firm* — RatnerPrestia

(57) ABSTRACT

A gas diffusion electrode is provided that enables the achievement of a fuel cell which has high drainage performance and maintains good power generation performance, while exhibiting high power generation performance particularly at a low temperature (40° C.), if used in the fuel cell. The gas diffusion electrode includes a microporous layer on at least one surface of a conductive porous substrate, wherein the microporous layer has a fluorine compound region having a length of 3-10 μm and a void having a length of 3-10 μm.

7 Claims, 1 Drawing Sheet

(56) References Cited

U.S. PATENT DOCUMENTS

| | | | | |
|---|---|---|---|---|
| 2011/0171563 | A1* | 7/2011 | Waki | H01M 8/0245 |
| | | | | 429/514 |
| 2012/0034548 | A1* | 2/2012 | Okuyama | H01M 4/8807 |
| | | | | 429/480 |
| 2016/0056480 | A1 | 2/2016 | Hori | |
| 2017/0012297 | A1 | 1/2017 | Tanimura et al. | |

FOREIGN PATENT DOCUMENTS

| | | | |
|---|---|---|---|
| CN | 106030879 | A | 10/2016 |
| CN | 106104877 | A | 11/2016 |
| JP | 2004119398 | A | 4/2004 |
| JP | 2005243295 | A | 9/2005 |
| JP | 2010129310 | A | 6/2010 |
| JP | 5621949 | B1 | 11/2014 |
| JP | 2016015216 | A | 1/2016 |
| JP | 5950031 | B2 | 7/2016 |
| WO | 2014167612 | A1 | 10/2014 |

OTHER PUBLICATIONS

Chinese Office Action for Chinese Application No. 201880006686. 1, deled Sep. 13, 2021, with translation, 15 pages.

* cited by examiner

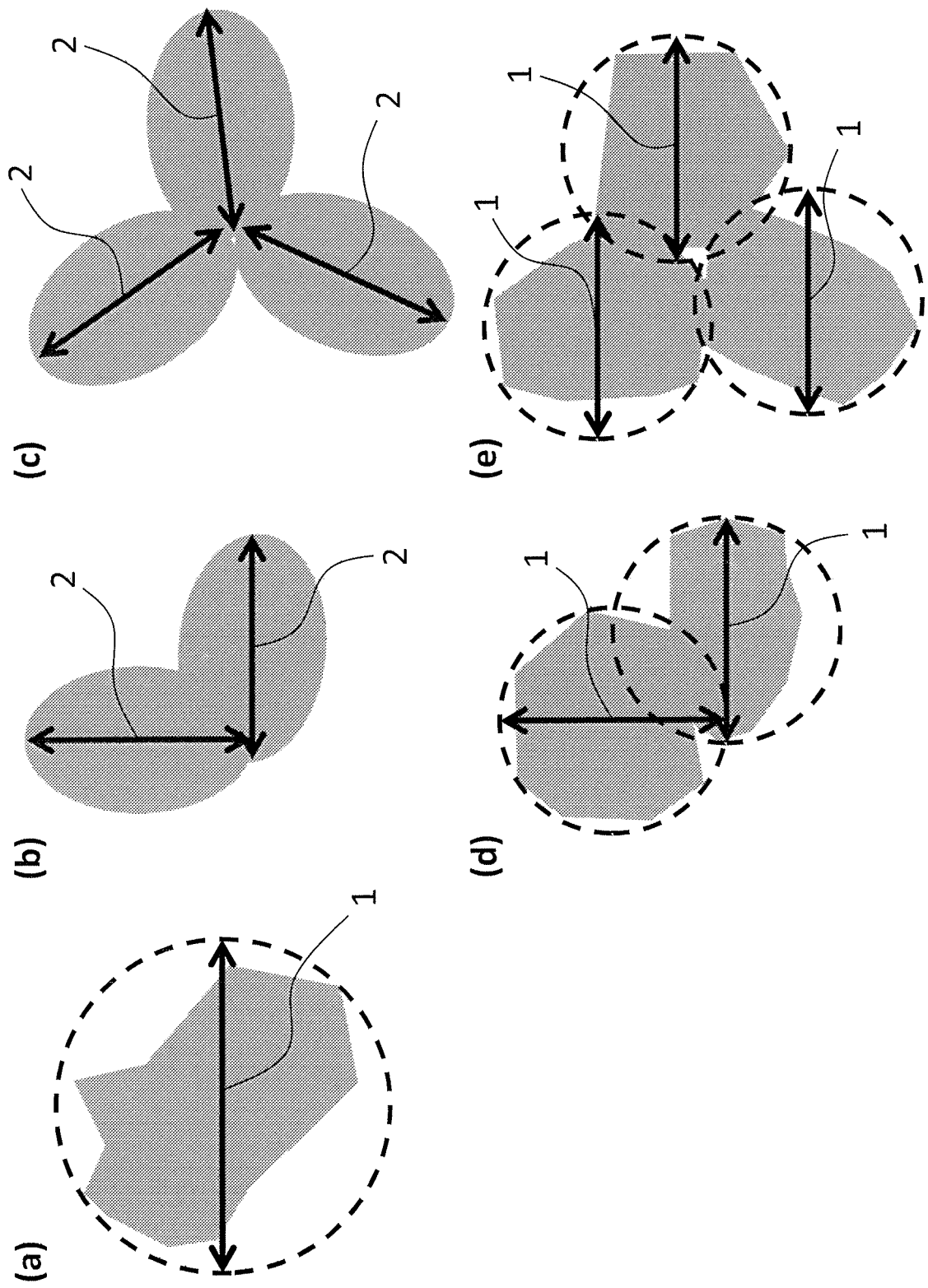

GAS DIFFUSION ELECTRODE AND FUEL CELL

CROSS REFERENCE TO RELATED APPLICATIONS

This is the U.S. National Phase application of PCT/JP2018/000569, filed Jan. 12, 2018, which claims priority to Japanese Patent Application No. 2017-007303, filed Jan. 19, 2017, the disclosures of these applications being incorporated herein by reference in their entireties for all purposes.

FIELD OF THE INVENTION

The present invention relates to a gas diffusion electrode suitably used for a fuel cell. The present invention relates particularly to a gas diffusion electrode suitably used in, among fuel cells, a polymer electrolyte fuel cell used as a power source for a fuel cell vehicle and the like.

BACKGROUND OF THE INVENTION

A fuel cell is a mechanism for electrically extracting energy generated when hydrogen is allowed to react with oxygen to produce water. The fuel cell is expected to be widely used as clean energy because of its high energy efficiency and the fact that it discharges only water. Among fuel cells, a polymer electrolyte fuel cell is known as a fuel cell used as a power source for a fuel cell vehicle and the like.

An electrode used in a polymer electrolyte fuel cell is sandwiched and disposed between two separators in the polymer electrolyte fuel cell. The electrode has a structure including a polymer electrolyte membrane, catalyst layers formed on both surfaces of the polymer electrolyte membrane, and gas diffusion layers formed outside the catalyst layers. A gas diffusion electrode is distributed as an individual member for forming the gas diffusion layer in the electrode. As the performance required of the gas diffusion electrode, for example, there are gas diffusibility, electrical conductivity for collecting electricity generated in the catalyst layer, and water drainability for efficiently removing moisture generated on the surface of the catalyst layer. In order to obtain such a gas diffusion electrode, generally, a conductive porous substrate having both gas diffusion ability and electrical conductivity is used.

Specific examples of the conductive porous substrate include carbon felt, carbon paper, and carbon cloth made of carbon fibers. Among them, carbon paper is most preferable from the viewpoint of mechanical strength and the like.

As described above, since the fuel cell is a system for electrically extracting energy generated when hydrogen is allowed to react with oxygen to produce water, under an increased electrical load, that is, under a large current taken out to the outside of the cell, a large amount of water (water vapor) is produced. The water vapor condenses into water droplets at low temperature to block pores of the gas diffusion electrode, and thus reduces the amount of gas (oxygen or hydrogen) supplied to the catalyst layer. If all the pores are finally blocked, power generation may stop (this phenomenon is called flooding). On the other hand, in a fuel cell for a fuel cell vehicle and the like, power generation performance under high temperature driving conditions is also required. At high temperatures, an electrolyte membrane is likely to be dried, which lowers the ion conductivity of the electrolyte membrane and reduces the power generation performance (this phenomenon is called dry-up).

In order to prevent the occurrence of flooding as much as possible, water drainability is required of the gas diffusion electrode. As a means for improving the water drainability, a gas diffusion electrode substrate in which a conductive porous substrate is subjected to a water repellent treatment is usually used to improve the water repellency.

In addition, when the conductive porous substrate subjected to the water repellent treatment as described above is used as a gas diffusion electrode as it is, condensation of water vapor generates large water droplets and tends to cause flooding, since the fibers of the conductive porous substrate are coarsely woven. Therefore, a layer called a microporous layer is sometimes provided on the conductive porous substrate having been subjected to the water repellent treatment by applying a coating solution in which conductive fine particles such as carbon black are dispersed, followed by drying and sintering.

There is a known technology which allows this microporous layer to contain a fluorine compound as a water repellent material in order to impart water repellency also to the microporous layer and in which a removable material that disappears at the time of sintering or fibrous carbon is contained in order to provide a void in the microporous layer (Patent Documents 1 and 2). Patent Document 1 discloses that porosity is increased by blending filler carbon or the like having a high aspect ratio or increasing blending amounts of a removal material and a water repellent material. Patent Document 2 discloses that the porosity is increased by intertwining fibrous carbon and a water repellent material with each other.

Patent Document 1: Japanese Patent No. 5950031
Patent Document 2: Japanese Patent Laid-open Publication No. 2004-119398

SUMMARY OF THE INVENTION

However, in the gas diffusion electrode described in Patent Document 1, the presence of a filler having a high aspect ratio or a removal material is premised. When the filler is used, safety to human body is unknown. On the other hand, when the removal material is used, the removal material cannot disappear at the time of sintering, and electrical conductivity and gas diffusibility of a microporous layer may be lowered, and power generation performance of a fuel cell may be lowered. There is a tendency to affect the power generation performance at low temperatures.

In a gas diffusion electrode described in Patent Document 2, the presence of fibrous carbon is premised, and it is described that a water repellent material alone cannot provide a sufficient gas flow path after hot pressing, and electric conduction is insufficient.

Thus, an object of the present invention is to provide a gas diffusion electrode which improves gas diffusibility and water drainability, maintains good power generation performance when used in a fuel cell, and improves the power generation performance particularly at low temperature (40° C.).

In order to solve the above-mentioned problems, the present invention employs the following means.

A gas diffusion electrode having a microporous layer on at least one surface of a conductive porous substrate, in which the microporous layer has a fluorine compound region having a major axis of 3 to 10 µm and a void having a major axis of 3 to 10 µm.

The gas diffusion electrode of the present invention has high gas diffusibility and water drainability and maintains good power generation performance when used in a fuel cell, and a fuel cell having high power generation performance particularly at low temperature (40° C.) can be obtained.

BRIEF DESCRIPTION OF THE DRAWINGS

FIG. 1 is a schematic view showing an example of a method of calculating a major axis in the present invention.

DETAILED DESCRIPTION OF CERTAIN EMBODIMENTS OF THE INVENTION

A gas diffusion electrode of the present invention is a gas diffusion electrode having a microporous layer on at least one surface of a conductive porous substrate, and in this gas diffusion electrode, the microporous layer has a fluorine compound region having a major axis of 3 to 10 μm and a void having a major axis of 3 to 10 μm.

Preferable specific examples of the conductive porous substrate used in the gas diffusion electrode of the present invention include porous substrates containing carbon fibers, such as a carbon fiber woven fabric, a carbon fiber paper sheet, a carbon fiber nonwoven fabric, carbon felt, carbon paper, and carbon cloth, and metal porous substrates such as a foamed sintered metal, a metal mesh, and an expanded metal. Among these, porous substrates containing carbon fibers, such as carbon felt, carbon paper, and carbon cloth are more preferable from the viewpoint of their excellent corrosion resistance. Furthermore, in view of being excellent in the property of absorbing dimensional change of the electrolyte membrane in the through-plane direction, that is, the "spring property", carbon paper is further preferable. In the present invention, carbon paper refers to a base material containing resin carbide, which is obtained by binding a carbon fiber paper sheet with carbide.

The gas diffusion electrode of the present invention includes the microporous layer on at least one surface of the conductive porous substrate. Here, the microporous layer is a layer containing conductive fine particles such as carbon black, carbon nanotubes, carbon nanofibers, chopped carbon fibers, graphene and graphite.

As the conductive fine particles, carbon black is suitably used from the viewpoint of its low cost, safety, and stability of the product quality. As carbon black, acetylene black is particularly suitably used from the viewpoint that it contains slight amount of impurities and hardly lowers the activity of the catalyst.

The ash content can be mentioned as a measure of the content of impurities in carbon black. As the conductive fine particles in the present invention, it is preferable to use carbon black having an ash content of 0.1% by mass or less. The ash content in carbon black is preferably as low as possible, and carbon black having an ash content of 0% by mass, that is, carbon black containing no ash is particularly preferable. The aspect ratio of carbon black is preferably 2 or less. If filler-like carbon black having an aspect ratio of more than 2 is used, safety to human body is unknown, so that the aspect ratio is preferably 2 or less.

The microporous layer is required to have properties such as electrical conductivity, gas diffusibility, water drainability, moisture retention, and thermal conductivity, as well as resistance to strong acids on the anode side and oxidation resistance on the cathode side inside a fuel cell. Thus, in addition to the conductive fine particles, the microporous layer contains a water repellent material such as a fluorine compound. Examples of the fluorine compound which may be contained in the microporous layer include a polytetrafluoroethylene (PTFE), a tetrafluoroethylene-hexafluoropropylene copolymer (FEP), a tetrafluoroethylene-perfluoroalkylvinylether copolymer (PFA), and an ethylene-tetrafluoroethylene copolymer (ETFE). The microporous layer preferably contains PTFE from the viewpoint that water repellency is particularly high and the particle diameter is easily controlled. That is, the gas diffusion electrode of the present invention preferably contains PTFE as a fluorine compound in a fluorine compound region described later.

In the present invention, the microporous layer contains a fluorine compound, whereby the fluorine compound region based on the fluorine compound is present. The fluorine compound in the fluorine compound region is preferably in a state where the water repellent material used when the microporous layer is formed is still added or in a state where a portion of the water repellent material is dissolved.

In addition, it is preferable that a portion of the void in the microporous layer be in a state in which the water repellent material in the microporous layer is dissolved and in contact with the surrounding carbon black.

The microporous layer in the present invention has a fluorine compound region having a major axis of 3 to 10 μm and a void having a major axis of 3 to 10 μm. Here, the fluorine compound region refers to a portion where the fluorine compound is aggregated or present, and is a region dotted in the microporous layer while in contact with the conductive fine particles. When the fluorine compound region or the void has an elliptical shape, the major axis indicates a major axis of the ellipse. When the shape of the fluorine compound region or the void is indeterminate as illustrated in FIG. 1(a), a diameter 1 of a circumscribed circle is taken as the major axis. When the shape of the fluorine compound region or the void is a shape in which a plurality of ellipses overlap as illustrated in FIG. 1(b) or FIG. 1(c), an average value of a major axis 2 of each ellipse is taken as the major axis of the fluorine compound region or the void. When the shape of the fluorine compound region or the void is a shape in which a plurality of indeterminate shapes overlap as illustrated in FIG. 1(d) or FIG. 1(e), an average value of the major axis 1 of each indeterminate circumscribed circle is taken as the major axis of the fluorine compound region or the void.

Having the fluorine compound region having a major axis of 3 to 10 μm can be achieved, for example, by containing a fluorine compound having an average particle diameter of 3 to 10 μm in the microporous layer and leaving the fluorine compound without melting the fluorine compound completely at the time of sintering. Having the void having a major axis of 3 to 10 μm can be achieved, for example, by containing a fluorine compound of 3 to 10 μm in the microporous layer and melting the fluorine compound at the time of sintering.

The presence or absence of the fluorine compound region having a major axis of 3 to 10 μm can be confirmed by a scanning electron microscope (SEM). When a material containing a fluorine compound is observed by increasing the magnification of a scanning electron microscope (SEM), focusing becomes difficult because the electrical conductivity of the material is low, so that it can be confirmed that the fluorine compound region is included by using an energy dispersive X-ray spectrometer (EDX) attached to SEM. Similarly, the presence or absence of the void having a major axis of 3 to 10 μm can also be confirmed by the scanning electron microscope (SEM).

If the major axis of the fluorine compound region or the void is less than 3 μm, the gas diffusibility in a perpendicular cross-section direction (through-plane direction) of the gas diffusion electrode may be insufficient, and the water drainability may be insufficient; therefore, power generation performance of the fuel cell may be insufficient. On the other hand, when the major axis of the fluorine compound region or the void exceeds 10 µm, the electrical conductivity of the gas diffusion electrode may be insufficient, and the power generation performance of the fuel cell may be insufficient. The major axis of the fluorine compound region or the void is more preferably 3 µm or more and 8 µm or less. This is because when the major axis is 8 µm or less, the electrical conductivity of the gas diffusion electrode is further improved. In the present invention, it is preferable that the void do not penetrate in the perpendicular cross-section direction of the gas diffusion electrode. That is, it is preferable that at least one end of the void be located inward of a layer surface of the microporous layer. If the void penetrates in the perpendicular cross-section direction, the electrical conductivity may be lowered.

In the present invention, the thickness of the microporous layer is preferably 10 µm or more and 100 µm or less, considering that it is preferable that the void do not penetrate in the perpendicular cross-section direction. If the thickness of the microporous layer exceeds 100 µm, the diffusivity (permeability or water drainability) of gas or water of the gas diffusion electrode itself may be reduced, or electrical resistance may be increased. The thickness of the microporous layer is preferably 80 µm or less, more preferably 40 µm or less, from the viewpoint of enhancing gas permeability and water drainability, or reducing electrical resistance, and the thickness of the microporous layer is preferably 15 µm or more in order to cover roughness of the conductive porous substrate.

In the case of obtaining the thicknesses of the gas diffusion electrode or the conductive porous substrate, the following method can be employed: cutting the gas diffusion electrode in the through-plane direction using an ion milling apparatus such as IM4000 manufactured by Hitachi High-Technologies Corporation, observing the perpendicular cross section of the gas diffusion electrode with SEM to obtain a SEM image, and calculating the thicknesses from the SEM image. The thickness of the microporous layer can be obtained by subtracting the thickness of the conductive porous substrate from the thickness of the gas diffusion electrode. In the area of the microporous layer, the area of the field of view of the SEM can be determined from a scale bar.

In the present invention, it is preferable that 0.15 to 2.0 fluorine compound regions having a major axis of 3 to 10 µm be included in 1000 µm$^2$ of the microporous layer. If the number is less than 0.15, the water repellency of the gas diffusion electrode is insufficient, so that the water drainability may be insufficient. On the other hand, when the number exceeds 2.0, the electrical conductivity of the gas diffusion electrode may be lowered, and the power generation performance of the fuel cell may be lowered. As a means for including 0.15 to 2.0 fluorine compound regions having a major axis of 3 to 10 µm in 1000 µm$^2$ of the microporous layer, for example, there can be mentioned a method of applying a coating solution for microporous layer formation (microporous layer coating solution) described later, in which a fluorine compound is dispersed, drying and sintering the coating solution to form a microporous layer, and including the fluorine compound region in a state where the fluorine compound is dispersed in the formed microporous layer.

It is preferable that 0.15 to 2.0 voids having a major axis of 3 to 10 µm be included in 1000 µm$^2$ of the microporous layer. If the number is less than 0.15, the gas and water diffusivity of the gas diffusion electrode may be insufficient. On the other hand, when the number exceeds 2.0, the electrical conductivity of the gas diffusion electrode may be lowered, and the power generation performance of the fuel cell may be lowered. As a means for including 0.15 to 2.0 voids having a major axis of 3 to 10 µm in 1000 µm$^2$ of the microporous layer, for example, there can be mentioned a method of including the void in a state where the fluorine compound is dispersed in the microporous layer.

Furthermore, in the present invention, an average value of the major axis of the fluorine compound region is preferably 2 to 7 µm. In the present invention, an average value of the major axis of the void is preferably 2 to 7 µm. When the average value of the major axis of the fluorine compound region or the average value of the major axis of the void is less than 2 µm, the gas and water diffusivity of the gas diffusion electrode may be insufficient. On the other hand, when the average value of the major axis of the fluorine compound region or the average value of the major axis of the void exceeds 7 µm, the electrical conductivity of the gas diffusion electrode may be lowered, and the power generation performance of the fuel cell may be lowered. Furthermore, the average value of the major axis is preferably 3 to 7 µm. This is because when the average value of the major axis is 3 µm or more, the gas and water diffusivity is more easily secured. For example, when a fluorine compound having an average particle diameter of 2 to 7 µm is included, the average value of the major axis of the fluorine compound region can be 2 to 7 µm, or the average value of the major axis of the void can be 2 to 7 µm. In the present invention, it is more preferable that the average value of the major axis of the fluorine compound region be 2 to 7 µm and the average value of the major axis of the void be 2 to 7 µm. When the average value of the major axis of the fluorine compound region is 2 to 7 µm and when the average value of the major axis of the void is 2 to 7 µm, the gas and water diffusivity, the electrical conductivity of the gas diffusion electrode, and the power generation performance of the fuel cell are further improved.

As a preferable method of forming a microporous layer on at least one surface of a conductive porous substrate, there is a method of applying a coating solution for microporous layer formation (hereinafter referred to as a microporous layer coating solution) on at least one surface of the conductive porous substrate by screen printing, rotary screen printing, spraying, intaglio printing, gravure printing, die coating, bar coating, blade coating, knife coating, or the like.

The concentration of the conductive fine particles in 100% by mass of the microporous layer coating solution is preferably 5% by weight or more, more preferably 10% by mass or more, from the viewpoint of productivity. Although there is no upper limit to the concentration as long as viscosity, dispersion stability of conductive particles, coating properties of the coating liquid, etc. are suitable, in practice if the concentration of the conductive fine particles in the microporous layer coating solution exceeds 50% by mass, properness as a coating liquid may be lost.

It is general to apply the microporous layer coating solution and then perform sintering at 250° C. or more and 400° C. or less. By setting the sintering temperature to 250° C. or more, a water repellent resin is easily melted. Further, by setting the sintering temperature to 400° C. or less, generation of harmful gas such as hydrofluoric acid is easily suppressed.

As the conductive porous substrate used for the gas diffusion electrode of the present invention, a conductive porous substrate subjected to a water repellent treatment by the addition of a fluorine compound is suitably used. Since a fluorine compound acts as a water repellent material, the conductive porous substrate used in the present invention preferably contains a water repellent material such as a fluorine compound. Examples of the water repellent material contained in the conductive porous substrate, that is, the fluorine compound contained in the conductive porous substrate include PTFE, FEP, PFA, ETFE, polyvinylidene fluoride (PVDF), and polyvinyl fluoride (PVF), and PTFE or FEP which exhibits strong water repellency is preferable.

The amount of the water repellent material is not particularly limited, and the amount of the water repellent material is suitably about 0.1% by mass or more and 20% by mass or less in 100% by mass in total of the conductive porous substrate. If the amount of the water repellent material is less than 0.1% by mass, the water repellency may not be sufficiently exhibited. If the amount of the water repellent material exceeds 20% by mass, the pores which serve as gas diffusion paths or water drainage paths may be blocked, or the electric resistance may be increased.

A method of subjecting the conductive porous substrate to a water repellent treatment may be a coating technique of applying a water repellent material to the conductive porous substrate by die coating, spray coating, or the like, in addition to a generally known treatment technique of immersing the conductive porous substrate in a dispersion containing a water repellent resin. Further, processing by a dry process such as sputtering of a fluorine compound can also be applied. After the water repellent treatment, if necessary, a drying step or a sintering step may be added.

The fuel cell of the present invention also has the gas diffusion electrode of the present invention. As a method of producing the fuel cell of the present invention from the gas diffusion electrode of the present invention, known methods can be used. For example, the method described in Japanese Patent No. 5621949 can be used. Since the fuel cell of the present invention has the gas diffusion electrode of the present invention, the power generation performance is high.

EXAMPLES

Hereinafter, the present invention will be concretely described by way of examples. The materials used in the examples, the method for producing the gas diffusion electrode, and the method for evaluating the power generation performance of the fuel cell are shown below.

Example 1

<Materials>
A. Conductive Porous Substrate

Polyacrylonitrile-based carbon fiber "TORAYCA" (registered trademark) T300 (mean diameter: 7 μm) manufactured by Toray Industries, Inc. was cut at a short fiber mean length of 12 mm and dispersed in water to continuously make a paper by a wet papermaking method. Further, a 10% by mass aqueous solution of polyvinyl alcohol as a binder was applied on the paper and then dried to prepare a carbon fiber sheet having a carbon fiber areal weight of 17 $g/m^2$. The adhesion amount of the polyvinyl alcohol was 18 parts by mass with respect to 100 parts by mass of the carbon fiber.

Next, using a phenolic resin obtained by mixing a resol type phenolic resin and a novolak type phenolic resin at a 1:1 mass ratio of the non-volatile content as a thermosetting resin, a scaly graphite powder (average particle diameter 5 μm) as a carbon powder and methanol as a solvent, the materials were mixed at a ratio of thermosetting resin (non-volatile content)/carbon powder/solvent=10 parts by mass/5 parts by mass/85 parts by mass, to obtain a uniformly dispersed resin composition (mixed liquid).

Next, the carbon fiber sheet was subjected to a resin impregnation step of continuously impregnating the carbon fiber sheet with the mixed liquid of the resin composition and sandwiching the carbon fiber sheet between rolls to squeeze the carbon fiber sheet, and then the carbon fiber sheet was wound into a roll to give a precursor fiber sheet. Under the present circumstances, the roll was a smooth metallic roll having a structure allowing an excess resin composition to be removed by a doctor blade, and the two rolls were arranged horizontally with a fixed clearance provided therebetween, and the carbon fiber sheet was lifted upward vertically to adjust the loading amount of the resin composition as a whole. The loading amount of the phenolic resin in the precursor fiber sheet was 130 parts by mass with respect to 100 parts by mass of carbon fibers.

Heating plates were set in a press molding machine so that the plates would be parallel to each other, a spacer was placed on the lower heating plate, and a resin-impregnated carbon fiber paper piece was compressed by intermittently conveying the paper piece that was vertically sandwiched between release paper. In this case, a distance between upper and lower press plates was adjusted so as to obtain the precursor fiber sheet of a desired thickness after compression.

The compression treatment was carried out by repeating heating and pressurization, opening of the mold, and feeding of the carbon fibers, and the precursor fiber sheet was wound into a roll. The thickness of the compressed precursor fiber sheet in the compression step was measured at 0.15 Mpa and found to be 118 μm.

The compressed precursor fiber sheet was introduced into a heating furnace having a maximum temperature of 2400° C. kept in a nitrogen gas atmosphere, and while being continuously transferred in the heating furnace, the precursor fiber sheet was subjected to a carbonization step of baking the sheet, and then wound into a roll to give a conductive porous substrate. The thickness of the obtained conductive porous substrate at 0.15 MPa was 100 μm.

B. Microporous Layer

Carbon black, water repellent material ("POLYFLON" (registered trademark) PTFE Ruburon L-5 (PTFE resin, manufactured by Daikin Industries, Ltd.)), surfactant ("TRITON" (registered trademark) X-100 (manufactured by Nacalai Tesque, Inc.)) and water were used.

<Evaluation>
A. Method of Discriminating Fluorine Compound Region or Void, Method of Measuring Major Axis, and Method of Measuring Number First, a perpendicular cross section (cross section in through-plane direction) of the gas diffusion electrode was cut out by an ion milling device (IM4000 manufactured by Hitachi High-Technologies Corporation) and observed in three fields of view at 1500 times magnification of an image by a scanning electron microscope (SEM, S-4800 manufactured by Hitachi Ltd.).

In a portion that appeared gray at 1500 times magnification, a portion that could be focused to the same degree as the conductive fine particles present on the surface of the microporous layer by increasing the magnification to 5000 times and a portion where the presence of fluorine could be confirmed by an energy dispersive X-ray spectroscopy (EDX) device attached to SEM were determined as the fluorine compound regions.

A portion that appeared darker than the fluorine compound region when observed at 1500 times magnification and was out of focus when the magnification was increased to 5000 times because it was lower than the microporous layer and a portion where the presence of carbon could be confirmed by EDX were determined as voids.

In the presence or absence of the fluorine compound region having a major axis of 3 to 10 µm, the major axis of each fluorine compound region was measured using a scale bar, measurement was performed in three fields of view, and the presence or absence of the fluorine compound region was judged based on whether or not the fluorine compound region whose major axis was in the range of 3 to 10 µm was present in at least one field of view. Similarly, in the major axis of the void, the major axis of each void was measured using a scale bar, measurement was performed in three fields of view, and the major axis of the void was judged based on whether or not the void whose major axis was in the range of 3 to 10 µm was present in at least one field of view.

In the average value of the major axis of the fluorine compound region, the major axis of each fluorine compound region was measured using a scale bar, and an average value in three fields of view was determined. Similarly, in the average value of the major axis of the void, the major axis of each void was measured using a scale bar, and an average value in three fields of view was determined.

The number of the fluorine compound regions having a major axis of 3 to 10 µm in the microporous layer 1000 µm$^2$ was determined by counting the number of the fluorine compound regions having a major axis of 3 to 10 µm in 3000 µm$^2$ as the total of three fields of view and dividing the number by 3.

Similarly, the number of the voids having a major axis of 3 to 10 µm in the microporous layer 1000 µm$^2$ was determined by counting the number of the voids having a major axis of 3 to 10 µm in 3000 µm$^2$ as the total of three fields of view and dividing the number by 3.

B. Method of Measuring Conduction Resistance

In an autograph, the gas diffusion electrode was sandwiched between two gold-plated SUS blocks and pressurized to 1.0 MPa. A current of 1 A was applied between the blocks, the voltage was measured, and the conduction resistance (mΩ·cm$^2$) was determined.

C. Method of Measuring Gas Diffusibility in Through-Plane Direction

A gas water vapor permeation diffusion evaluation apparatus (MVDP-200C) manufactured by Seika Corporation was used to flow a mixed gas of oxygen gas and nitrogen gas whose diffusibility was desired to be measured to one side (primary side) of the gas diffusion electrode, and to flow nitrogen gas to the other side (secondary side) of the gas diffusion electrode. The differential pressure between the primary side and the secondary side was controlled to around 0 Pa (0±3 Pa) (that is, there was almost no gas flow due to the pressure difference, and the gas transfer phenomenon would occur only by molecular diffusion), and the gas concentration at the time when equilibrium was achieved was measured with an oxymeter on the secondary side. This value (%) was used as an indicator of gas diffusibility in the through-plane direction.

D. Method of Evaluating Power Generation Performance

The obtained gas diffusion electrode was sandwiched on both sides of an electrolyte membrane/catalyst layer integrated product (electrolyte membrane "Gore Select (registered trademark)" manufactured by W. L. Gore & Associates, Co., LTD. and catalyst layers "PRIMEA (registered trademark)" manufactured by W. L. Gore & Associates, Co., LTD. formed on both surfaces of the electrolyte membrane) so that each catalyst layer would come into contact with each microporous layer, and the laminate was hot-pressed to prepare a membrane electrode assembly (MEA). This membrane electrode assembly was incorporated into a single cell for a fuel cell, and power generation was performed at a cell temperature of 40° C., a fuel utilization efficiency of 70%, and an air utilization efficiency of 40%, with hydrogen on the anode side and air on the cathode side being humidified to have dew points of 75° C. and 60° C., respectively. While increasing the current density, the value of current density at which power generation ceased (critical current density) was taken as an index of flooding resistance or water drainability. The same measurement was performed at a cell temperature of 90° C., and the obtained value was taken as an index of dry-up resistance. In addition, the power generation performance under ordinary operating conditions (cell temperature: 70° C.) was also measured.

Example 1

While a conductive porous substrate (carbon paper) wound into a roll being conveyed using a wind-up conveying device, the carbon paper was immersed in an immersion tank filled with a repellent dispersion dispersed in water such that the fluorine compound concentration was 2% by mass to perform a water-repellent treatment. The carbon paper was then dried with a dryer set at 100° C. and wound up by a wind-up machine, thereby giving a water-repellent-treated conductive porous substrate. As the water repellent material dispersion, PTFE dispersion D-210C (manufactured by Daikin Industries, Ltd.) diluted with water to have a PTFE concentration of 2% by mass was used.

Next, a winding-type continuous coater was provided in which a conveyance apparatus including an unwinding machine, a guide roll, a back roll, an unwinding machine for interlayer paper and a winding machine was equipped with a die coater, a dryer and a sintering machine.

As a conductive porous substrate-subjected to the hydrophobic treatment, a web in which a carbon paper was wound in a 400 m roll form was set in the unwinding machine.

The web was conveyed by driving rolls installed in an unwinding section, a winding section and a coater section. First, a microporous layer coating solution was applied using the die coater. Then, in the dryer, water and moisture was removed by drying with hot air at 100° C. Further, the web was sintered in the sintering machine set at 350° C., and then wound up by the winding machine.

The microporous layer coating solution was prepared as follows.

Microporous Layer Coating Solution:

15 parts by mass of carbon black, 5 parts by mass of a water repellent material (PTFE resin "POLYFLON" (registered trademark) PTFE Ruburon L-5, average particle diameter 5 µm), 15 parts by mass of a surfactant ("TRITON" (registered trademark) X-100) and 65 parts by mass of purified water were mixed and kneaded by a planetary mixer to prepare a coating liquid.

At the time of application of the microporous layer coating solution, the application amount was adjusted so that the sintered microporous layer would have an areal weight of 15 g/m$^2$.

To both sides of an electrolyte membrane with a catalyst layer provided on both surfaces thereof, the gas diffusion electrode prepared as described above was thermally press-bonded in such a manner that the microporous layer and the catalyst layer were in contact with each other, and the resulting product was incorporated into a single cell for a fuel cell. Power generation performance (limit current density) was evaluated at each of temperatures of 40° C., 70° C. and 90° C.

Physical properties measured are shown in Table 1.

Example 2

A gas diffusion electrode was obtained in the same manner as in Example 1 except that 15 parts by mass of carbon black, 8 parts by mass of a water repellent material (PTFE resin "POLYFLON" (registered trademark) PTFE Ruburon L-5), 15 parts by mass of a surfactant ("TRITON" (registered trademark) X-100) and 62 parts by mass of purified water were mixed and kneaded by a planetary mixer to prepare a coating liquid. Physical properties measured are shown in Table 1.

Example 3

A gas diffusion electrode was obtained in the same manner as in Example 1 except that 15 parts by mass of carbon black, 2 parts by mass of a water repellent material (PTFE resin "POLYFLON" (registered trademark) PTFE Ruburon L-5), 15 parts by mass of a surfactant ("TRITON" (registered trademark) X-100) and 68 parts by mass of purified water were mixed and kneaded by a planetary mixer to prepare a coating liquid. Physical properties measured are shown in Table 1.

Example 4

A gas diffusion electrode was obtained in the same manner as in Example 1 except that 15 parts by mass of carbon black, 11 parts by mass of a water repellent material (PTFE resin "POLYFLON" (registered trademark) PTFE Ruburon L-5), 15 parts by mass of a surfactant ("TRITON" (registered trademark) X-100) and 59 parts by mass of purified water were mixed and kneaded by a planetary mixer to prepare a coating liquid. Physical properties measured are shown in Table 1.

Comparative Example 1

A gas diffusion electrode was obtained in the same manner as in Example 1 except that 15 parts by mass of carbon black, 9 parts by mass of a water repellent material (PTFE dispersion "POLYFLON" (registered trademark) D-210C, average particle diameter 0.15 to 0.35 µm), 15 parts by mass of a surfactant ("TRITON" (registered trademark) X-100) and 61 parts by mass of purified water were mixed and kneaded by a planetary mixer to prepare a coating liquid. Physical properties measured are shown in Table 1.

Example 5

A gas diffusion electrode was obtained in the same manner as in Example 1 except that 15 parts by mass of carbon black, 5 parts by mass of a water repellent material (PTFE lubricant "Fluon" (registered trademark) L169J (manufactured by AGC Inc.), average particle diameter 17 µm), 15 parts by mass of a surfactant ("TRITON" (registered trademark) X-100) and 65 parts by mass of purified water were mixed and kneaded by a planetary mixer to prepare a coating liquid. Physical properties measured are shown in Table 1.

Comparative Example 2

A gas diffusion electrode was obtained in the same manner as in Example 1 except that the sintering temperature was set to 330° C. Physical properties measured are shown in Table 1.

Comparative Example 3

A gas diffusion electrode was obtained in the same manner as in Comparative Example 1 except that the sintering temperature was set to 380° C. Physical properties measured are shown in Table 1.

TABLE 1

| | | Unit | Example 1 | Example 2 | Example 3 | Example 4 | Example 5 |
|---|---|---|---|---|---|---|---|
| Water repellent material used for microporous layer | | — | | | Ruburon L-5 | | L169J |
| Amount of water repellent material | | Part(s) by mass | 5 | 8 | 2 | 11 | 5 |
| Presence or absence of fluorine compound region having major axis of 3 to 10 µm | | — | Presence | Presence | Presence | Presence | Presence |
| Presence or absence of void having major axis of 3 to 10 µm | | — | Presence | Presence | Presence | . Presence | Presence |
| Average value of major axis of fluorine compound region | | µm | 4.5 | 4.3 | 4.4 | 4.2 | 7.9 |
| Average value of major axis of void | | µm | 4.2 | 3.9 | 4.3 | 3.7 | 7.3 |
| The number of fluorine compound regions having major axis of 3 to 10 µm in 1000 µm$^2$ of microporous layer | | Pieces | 0.25 | 1.80 | 0.10 | 2.40 | 0.40 |
| The number of voids having major axis of 3 to 10 µm in 1000 µm$^2$ of microporous layer | | Pieces | 0.35 | 1.70 | 0.10 | 2.30 | 0.35 |
| Conduction resistance of gas diffusion electrode | | mΩ · cm | 1.4 | 1.5 | 1.4 | 1.6 | 1.3 |
| Gas diffusion electrode | Gas diffusibility in through-plane direction | % | 30.1 | 30.4 | 30.8 | 29.8 | 31.2 |
| | Power generation performance (@ 40° C.) | A/cm$^2$ | 1.74 | 1.76 | 1.72 | 1.76 | 1.71 |
| | Power generation performance (@ 70° C.) | A/cm$^2$ | 2.48 | 2.47 | 2.46 | 2.46 | 2.44 |
| | Power generation performance (@ 90° C.) | A/cm$^2$ | 1.67 | 1.66 | 1.67 | 1.64 | 1.61 |

TABLE 1-continued

|  | Unit | Comparative Example 1 | Comparative Example 2 | Comparative Example 3 |
|---|---|---|---|---|
| Water repellent material used for microporous layer | — | D-210C | Ruburon L-5 | D-210C |
| Amount of water repellent material | Part(s) by mass | 9 | 5 | 9 |
| Presence or absence of fluorine compound region having major axis of 3 to 10 μm | — | Absence | Presence | Absence |
| Presence or absence of void having major axis of 3 to 10 μm | — | Absence | Absence | Presence |
| Average value of major axis of fluorine compound region | μm | 1.3 | 4.7 | 0.9 |
| Average value of major axis of void | μm | 1.0 | 1.4 | 1.2 |
| The number of fluorine compound regions having major axis of 3 to 10 μm in 1000 μm$^2$ of microporous layer | Pieces | 0.00 | 0.62 | 0.00 |
| The number of voids having major axis of 3 to 10 μm in 1000 μm$^2$ of microporous layer | Pieces | 0.00 | 0.00 | 0.08 |
| Conduction resistance of gas diffusion electrode | mΩ·cm$^2$ | 1.7 | 1.7 | 1.8 |
| Gas diffusion electrode — Gas diffusibility in through-plane direction | % | 29.4 | 30.6 | 29.6 |
| Gas diffusion electrode — Power generation performance (@ 40° C.) | A/cm$^2$ | 1.70 | 1.68 | 1.70 |
| Gas diffusion electrode — Power generation performance (@ 70° C.) | A/cm$^2$ | 2.44 | 2.41 | 2.42 |
| Gas diffusion electrode — Power generation performance (@ 90° C.) | A/cm$^2$ | 1.63 | 1.60 | 1.65 |

DESCRIPTION OF REFERENCE SIGNS

1: Diameter of circumscribed circle
2: Major axis of ellipse

The invention claimed is:

1. A gas diffusion electrode comprising a microporous layer on at least one surface of a conductive porous substrate,
   wherein the microporous layer has a fluorine compound region having a major axis of 3 to 10 μm and a void having a major axis of 3 to 10 μm.

2. The gas diffusion electrode according to claim 1, wherein 0.15 to 2.0 fluorine compound regions having a major axis of 3 to 10 μm are included in 1000 μm$^2$ of the microporous layer.

3. The gas diffusion electrode according to claim 1, wherein 0.15 to 2.0 voids having a major axis of 3 to 10 μm are included in 1000 μm$^2$ of the microporous layer.

4. The gas diffusion electrode according to claim 1, wherein an average value of the major axis of the void is 2 to 7 μm.

5. The gas diffusion electrode according to claim 1, wherein an average value of the major axis of the fluorine compound region is 2 to 7 μm.

6. The gas diffusion electrode according to claim 1, wherein polytetrafluoroethylene (PTFE) is contained as a fluorine compound in the fluorine compound region.

7. A fuel cell comprising the gas diffusion electrode according to claim 1.

* * * * *